(12) United States Patent
Barak et al.

(10) Patent No.: US 10,101,797 B2
(45) Date of Patent: Oct. 16, 2018

(54) EFFICIENT POWER MANAGEMENT OF UART INTERFACE

(71) Applicant: Intel Corporation, Santa Clara, CA (US)

(72) Inventors: Amit Barak, Haifa (IL); David I. Poisner, Carmichael, CA (US); Yuval Elad, Petach-Tikva (IL); Herbert Liondas, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 291 days.

(21) Appl. No.: 14/499,107

(22) Filed: Sep. 27, 2014

(65) Prior Publication Data

US 2016/0091959 A1    Mar. 31, 2016

(51) Int. Cl.
*G06F 1/32* (2006.01)

(52) U.S. Cl.
CPC .......... *G06F 1/3287* (2013.01); *G06F 1/3209* (2013.01); *G06F 1/3203* (2013.01); *Y02D 10/171* (2018.01)

(58) Field of Classification Search
CPC ................................................... G06F 1/3293
USPC ......................................................... 713/320
See application file for complete search history.

(56) References Cited

U.S. PATENT DOCUMENTS

| | | | | | |
|---|---|---|---|---|---|
| 5,241,680 A | * | 8/1993 | Cole | ...................... | G06F 1/3228 713/321 |
| 5,566,169 A | * | 10/1996 | Rangan | ................... | H04L 12/44 370/352 |
| 6,038,436 A | * | 3/2000 | Priest | ................ | H04W 52/0238 340/7.33 |
| 6,167,078 A | * | 12/2000 | Russo | ....................... | H04L 5/16 375/222 |
| 6,601,178 B1 | * | 7/2003 | Gulick | .................. | G06F 13/385 713/300 |
| 7,093,153 B1 | * | 8/2006 | Witek | ....................... | G06F 1/08 327/100 |
| 7,103,788 B1 | * | 9/2006 | Souza | ...................... | G06F 1/32 710/15 |
| 7,111,158 B1 | * | 9/2006 | Burroughs | ............ | G06F 13/385 710/74 |
| 8,332,676 B2 | * | 12/2012 | Lyra | ..................... | G06F 13/102 713/300 |
| 8,452,995 B1 | * | 5/2013 | Lachwani | ............... | G06F 1/266 713/320 |
| 8,738,952 B1 | * | 5/2014 | Lachwani | ............. | G06F 1/3209 710/100 |

(Continued)

FOREIGN PATENT DOCUMENTS

CN    WO2012106973    *   8/2012

*Primary Examiner* — Jaweed A Abbaszadeh
*Assistant Examiner* — Volvick Derose
(74) *Attorney, Agent, or Firm* — Spectrum IP Law Group LLC

(57) ABSTRACT

Methods and apparatus relating to efficient and/or robust link power management of a UART (Universal Asynchronous Receiver/Transmitter) interface are described. In an embodiment, logic causes a link to enter into a low power consumption state in response to a message exchange over data lines of a UART (Universal Asynchronous Receiver/Transmitter) interface. The message exchange over the data lines of the UART interface is followed by a modification to one or more flow control signals coupled to the UART interface. Other embodiments are also disclosed.

25 Claims, 9 Drawing Sheets

(56) References Cited

U.S. PATENT DOCUMENTS

| | | | | |
|---|---|---|---|---|
| 8,811,420 B2* | 8/2014 | Singh | H04W 84/18 | 370/338 |
| 2002/0035702 A1* | 3/2002 | Chu | G06F 1/3209 | 713/323 |
| 2002/0078287 A1* | 6/2002 | Shinagawa | G06F 13/24 | 710/268 |
| 2002/0184413 A1* | 12/2002 | Wingen | G06F 13/385 | 710/52 |
| 2003/0009581 A1* | 1/2003 | Herfet | H04B 1/205 | 709/231 |
| 2003/0009700 A1* | 1/2003 | Emberty | G06F 1/184 | 713/300 |
| 2003/0093607 A1* | 5/2003 | Main | G06F 13/4045 | 710/306 |
| 2004/0083396 A1* | 4/2004 | Perahia | G06F 1/3221 | 713/300 |
| 2006/0090091 A1* | 4/2006 | Li | G06F 13/385 | 713/320 |
| 2007/0025492 A1* | 2/2007 | Canagasaby | H04L 25/0282 | 375/377 |
| 2007/0214389 A1* | 9/2007 | Severson | G06F 11/3656 | 714/30 |
| 2007/0230484 A1* | 10/2007 | Hu | H04L 12/40039 | 370/401 |
| 2008/0307240 A1* | 12/2008 | Dahan | G06F 1/06 | 713/320 |
| 2009/0111524 A1* | 4/2009 | Basaralu | G06F 1/3209 | 455/559 |
| 2009/0238576 A1* | 9/2009 | Schorpp | H04L 25/4902 | 398/141 |
| 2010/0128738 A1* | 5/2010 | Barrass | H04L 12/10 | 370/445 |
| 2010/0191995 A1* | 7/2010 | Levy | G06F 1/3209 | 713/323 |
| 2010/0330927 A1* | 12/2010 | Cherukuri | G06F 1/3287 | 455/68 |
| 2011/0093727 A1* | 4/2011 | Hwang | G06F 1/266 | 713/320 |
| 2011/0093728 A1* | 4/2011 | Das | G06F 1/3203 | 713/320 |
| 2012/0159218 A1* | 6/2012 | Vangala | G06F 9/5094 | 713/323 |
| 2013/0012184 A1* | 1/2013 | Li | H04L 69/32 | 455/418 |
| 2013/0318380 A1* | 11/2013 | Behrens | H04L 12/12 | 713/323 |
| 2014/0082392 A1* | 3/2014 | Nishizawa | G06F 1/3234 | 713/323 |
| 2014/0185511 A1* | 7/2014 | Zhang | H04W 52/0251 | 370/311 |
| 2014/0247831 A1* | 9/2014 | Messner | H04L 12/12 | 370/400 |
| 2015/0082064 A1* | 3/2015 | Sinha | H04W 52/0251 | 713/323 |
| 2015/0085187 A1* | 3/2015 | Chen | H04N 5/38 | 348/441 |
| 2015/0131497 A1* | 5/2015 | Arnal | H04L 47/35 | 370/282 |
| 2016/0014715 A1* | 1/2016 | Patil | H04W 52/0216 | 370/329 |

* cited by examiner

EFFICIENT POWER MANAGEMENT OF UART INTERFACE

FIELD

The present disclosure generally relates to the field of electronics. More particularly, an embodiment relates to efficient power management of a UART (Universal Asynchronous Receiver/Transmitter) interface.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

In computing systems, components within the system may need to intercommunicate, and to do so in a power efficient manner, e.g., in order to extend battery life. One such interface is a UART (Universal Asynchronous Receiver/Transmitter) interface, which transforms data between parallel and serial formats. UARTs can be used in conjunction with communication standards, e.g., providing configurable data format and transmission speeds.

Interconnect protocols can define active and low power states, as well as handshake sequences to transition between such states. Criteria of when conversing entities should or may transition between states may be part of the protocol specification, or left to an application. However, entering low power state does not always guarantee lower power consumption—it allows for it. The protocol definitions should be such that allows significant power saving on one hand (e.g., turning off oscillators, reducing voltages, etc.), and, fast enough return to active state on another hand.

To this end, some embodiments provide an efficient and/or robust link power management for four-wire UART interfaces. The target UART interface includes flow control signals (such as RTS (Request To Send) and CTS (Clear To Send)), in addition to data related signals such Receive Data (RXD) and Transmit Data (TXD) signals. Such embodiments address at least two problems by: (a) reducing the amount of overhead associated with resolving race conditions during transitions into and out of low power link state; and/or (b) eliminating the need for asynchronous wake detect circuits and/or high frequency clocks. And, these goals are achieved without adding pins or wires to the interface. By contrast, previous solutions tend to either employ unreliable wake messages (thus, requiring error recovery flows) or out-of-band signals which typically increase solution footprint and cost.

Moreover, various embodiments simplify implementation, debug, and/or sustaining support of power managed four-wire UART interface. This allows for minimization of effort and shortens the time to market for products, without compromising functionality and/or performance of the interface.

Figure 1:
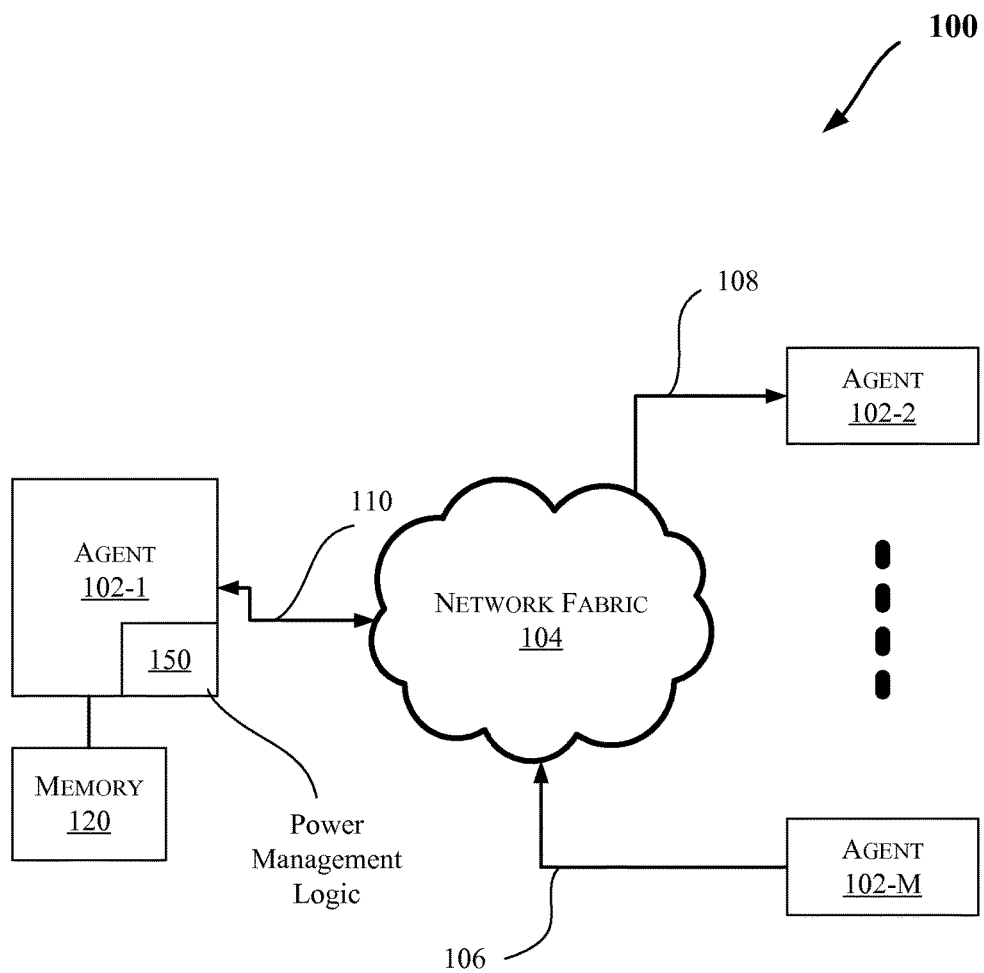
FIG. 1 illustrates a block diagram of an embodiment of a computing systems, which can be utilized to implement various embodiments discussed herein.

Moreover, the techniques discussed herein can be utilized in various computing systems (e.g., including a mobile device such as a smartphone, tablet, UMPC (Ultra-Mobile Personal Computer), laptop computer, Ultrabook™ computing device, smart watch, smart glasses, etc.), such as those discussed with reference to FIGS. 1-7. More particularly, FIG. 1 illustrates a block diagram of a computing system 100, according to an embodiment. The system 100 includes one or more agents 102-1 through 102-M (collectively referred to herein as "agents 102" or more generally "agent 102"). In an embodiment, one or more of the agents 102 are components of a computing system, such as the computing systems discussed with reference to FIGS. 1-7.

As illustrated in FIG. 1, the agents 102 communicate via a network fabric 104. In one embodiment, the network fabric 104 includes a computer network that allows various agents (such as computing devices) to communicate data. In an embodiment, the network fabric 104 includes one or more interconnects (or interconnection networks) that communicate via a serial (e.g., point-to-point) link and/or a shared communication network (which is be configured as a ring in an embodiment). Each link may include one or more lanes. For example, some embodiments facilitate component debug or validation on links that allow communication with Fully Buffered Dual in-line memory modules (FBD), e.g., where the FBD link is a serial link for coupling memory modules to a host controller device (such as a processor or memory hub). Debug information is transmitted from the FBD channel host such that the debug information is observed along the channel by channel traffic trace capture tools (such as one or more logic analyzers).

In one embodiment, the system 100 supports a layered protocol scheme, which includes a physical layer, a link layer, a routing layer, a transport layer, and/or a protocol layer. The fabric 104 further facilitates transmission of data (e.g., in form of packets) from one protocol (e.g., caching processor or caching aware memory controller) to another protocol for a point-to-point or shared network. Also, in some embodiments, the network fabric 104 provides communication that adheres to one or more cache coherent protocols.

Furthermore, as shown by the direction of arrows in FIG. 1, the agents 102 can transmit and/or receive data via the network fabric 104. Hence, some agents utilize a unidirectional link, while others utilize a bidirectional link for communication. For instance, one or more agents (such as agent 102-M) transmit data (e.g., via a unidirectional link 106), other agent(s) (such as agent 102-2) receive data (e.g., via a unidirectional link 108), while some agent(s) (such as agent 102-1) both transmit and receive data (e.g., via a bidirectional link 110).

Additionally, at least one of the agents 102 is a home agent and one or more of the agents 102 are requesting or caching agents. Generally, requesting/caching agents send request(s) to a home node/agent for access to a memory address with which a corresponding "home agent" is associated. Further, in an embodiment, one or more of the agents 102 (only one shown for agent 102-1) have access to a memory (which can be dedicated to the agent or shared with other agents) such as memory 120. In some embodiments, each (or at least one) of the agents 102 is coupled to the memory 120 that is either on the same die as the agent or otherwise accessible by the agent. Also, as shown in FIG. 1, agents 102 include link power management logic 150 to facilitate efficient and/or robust link power management for UART interfaces (e.g., utilizing flow control signals in four-wire UART interfaces), as will be further discussed herein.

Figure 2:
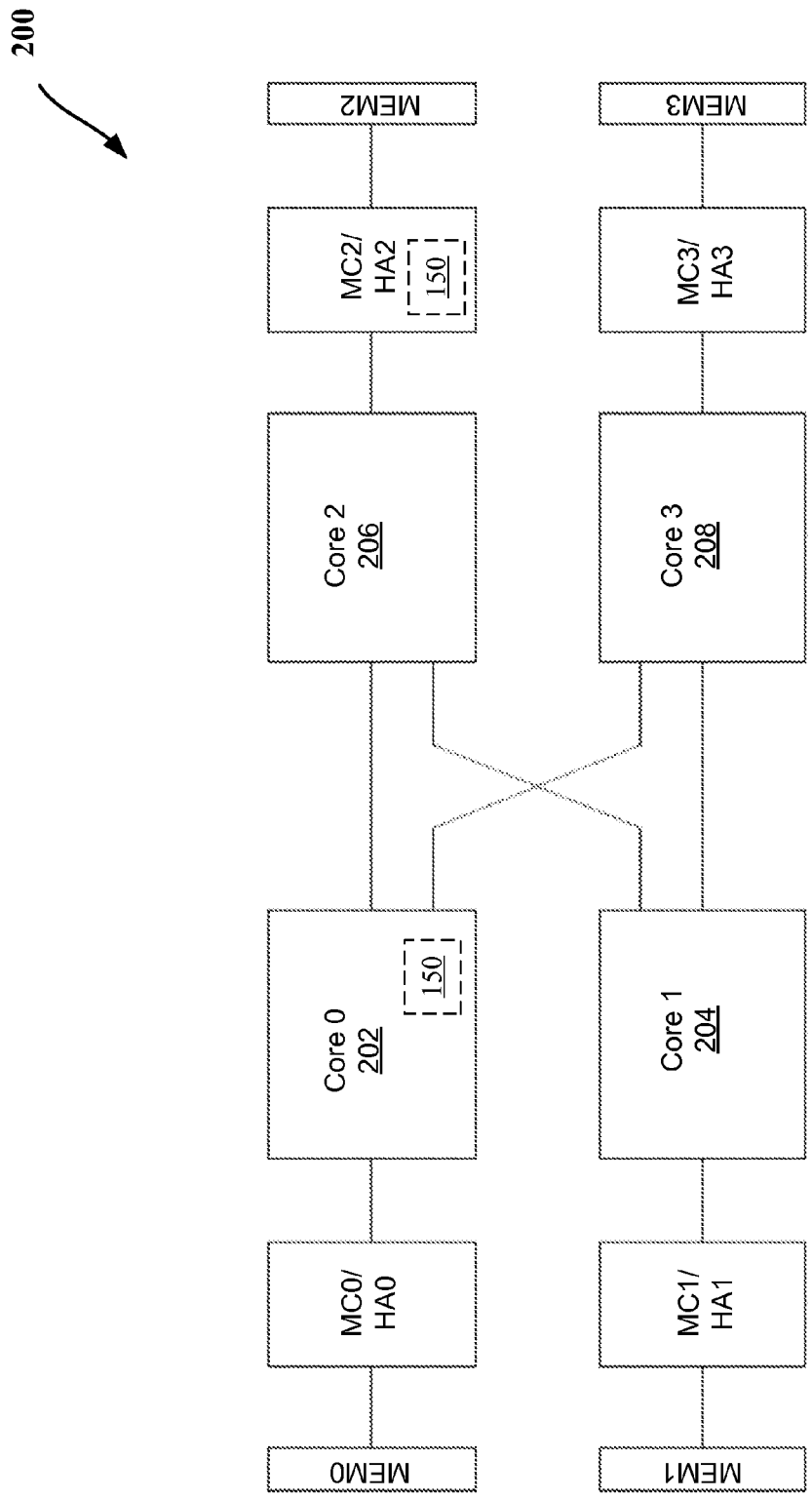
FIG. 2 illustrates a block diagram of an embodiment of a computing system, which can be utilized to implement one or more embodiments discussed herein.

FIG. 2 is a block diagram of a computing system 200 in accordance with an embodiment. System 200 includes a plurality of sockets 202-208 (four shown but some embodiments can have more or less socket). Each socket includes a processor. Also, various agents in the system 200 can communicate via logic 150. Even though logic 150 is only shown in items 202 and MC2/HA2, logic 150 may be provided in other agents of system 200. Further, more or less logic blocks can be present in a system depending on the implementation. Additionally, each socket is coupled to the other sockets via a point-to-point (PtP) link, or a differential interconnect, such as a Quick Path Interconnect (QPI), MIPI (Mobile Industry Processor Interface), etc. As discussed with respect the network fabric 104 of FIG. 1, each socket is coupled to a local portion of system memory, e.g., formed by a plurality of Dual Inline Memory Modules (DIMMs) that include dynamic random access memory (DRAM).

In another embodiment, the network fabric is utilized for any System on Chip (SoC or SOC) application, utilize custom or standard interfaces, such as, ARM compliant interfaces for AMBA (Advanced Microcontroller Bus Architecture), OCP (Open Core Protocol), MIPI (Mobile Industry Processor Interface), PCI (Peripheral Component Interconnect) or PCIe (Peripheral Component Interconnect express).

Some embodiments use a technique that enables use of heterogeneous resources, such as AXI/OCP technologies, in a PC (Personal Computer) based system such as a PCI-based system without making any changes to the IP resources themselves. Embodiments provide two very thin hardware blocks, referred to herein as a Yunit and a shim, that can be used to plug AXI/OCP IP into an auto-generated interconnect fabric to create PCI-compatible systems. In one embodiment, a first (e.g., a north) interface of the Yunit connects to an adapter block that interfaces to a PCI-compatible bus such as a direct media interface (DMI) bus, a PCI bus, or a Peripheral Component Interconnect Express (PCIe) bus. A second (e.g., south) interface connects directly to a non-PC interconnect, such as an AXI/OCP interconnect. In various implementations, this bus may be an OCP bus.

In some embodiments, the Yunit implements PCI enumeration by translating PCI configuration cycles into transactions that the target IP can understand. This unit also performs address translation from re-locatable PCI addresses into fixed AXI/OCP addresses and vice versa. The Yunit may further implement an ordering mechanism to satisfy a producer-consumer model (e.g., a PCI producer-consumer model). In turn, individual IPs are connected to the interconnect via dedicated PCI shims. Each shim may implement the entire PCI header for the corresponding IP. The Yunit routes all accesses to the PCI header and the device memory space to the shim. The shim consumes all header read/write transactions and passes on other transactions to the IP. In some embodiments, the shim also implements all power management related features for the IP.

Thus, rather than being a monolithic compatibility block, embodiments that implement a Yunit take a distributed approach. Functionality that is common across all IPs, e.g., address translation and ordering, is implemented in the Yunit, while IP-specific functionality such as power management, error handling, and so forth, is implemented in the shims that are tailored to that IP.

In this way, a new IP can be added with minimal changes to the Yunit. For example, in one implementation the changes may occur by adding a new entry in an address redirection table. While the shims are IP-specific, in some implementations a large amount of the functionality (e.g., more than 90%) is common across all IPs. This enables a rapid reconfiguration of an existing shim for a new IP. Some embodiments thus also enable use of auto-generated interconnect fabrics without modification. In a point-to-point bus architecture, designing interconnect fabrics can be a challenging task. The Yunit approach described above leverages an industry ecosystem into a PCI system with minimal effort and without requiring any modifications to industry-standard tools.

As shown in FIG. 2, each socket is coupled to a Memory Controller (MC)/Home Agent (HA) (such as MC0/HA0 through MC3/HA3). The memory controllers are coupled to a corresponding local memory (labeled as MEM0 through MEM3), which can be a portion of system memory (such as memory 512 of FIG. 5). In some embodiments, the memory controller (MC)/Home Agent (HA) (such as MC0/HA0 through MC3/HA3) can be the same or similar to agent 102-1 of FIG. 1 and the memory, labeled as MEM0 through MEM3, can be the same or similar to memory devices discussed with reference to any of the figures herein. Also, in one embodiment, MEM0 through MEM3 can be configured to mirror data, e.g., as master and slave. Also, one or more components of system 200 can be included on the same integrated circuit die in some embodiments.

Furthermore, at least one implementation (such as shown in FIG. 2) can be used for a socket glueless configuration with mirroring. For example, data assigned to a memory controller (such as MC0/HA0) is mirrored to another memory controller (such as MC3/HA3) over the PtP links.

Generally, communication links are considered reliable or unreliable by upper layers. Reliable links relieve some burden from upper layers. For example, when working with unreliable links, upper layers need to handle link anomalies such as corrupt frames, missing frames, unsolicited link state changes, etc. Interconnects can be generally divided into two categories: (a) master-slave interfaces; and/or (b) symmetrical interfaces. Master-slave interfaces are usually simpler to design and debug, while symmetrical interfaces can be more efficient yet sometimes more complicated, especially if the protocol running over the interface is not a streaming protocol. Some interfaces, such as PCI (Peripheral Component Interconnect) are hybrid, where the link configuration is of a master-slave regime, while data transfer and power management use symmetrical protocols.

One of the methods to ensure reliable transfer of data over a UART interface utilizes Hardware Flow Control (HW_FC). When using HW_FC, flow control signals (such as RTS and CTS) indicate when they can transmit and receive information over data lines. Generally, UART hardware state machines control, and sense these signals, in synchronization with transmit and receive FIFO (First-In, First Out) states.

Serial interfaces such as USB (Universal Serial Bus), PCIe (PCI express), and two-wire UART incorporate signaling over data wires, or, out-of-band signals for link power management. Despite UARTs being in use for many years, none of the products that use UART currently or in the past seem to employ power management using CTS or RTS signals such as described herein.

In some implementations, power management signaling (especially, the transition from a low power state to active state over data lines) exposes the handshake to a race conditions, where both sides of the link initiate such transition at approximately the same time. In such scenarios, receivers of one or both parties will occasionally encounter erroneous incoming data (characters), requiring implementation for error recovery mechanisms. Wake up signaling over data lines may also require asynchronous transition/level detectors or, the presence of high frequency clocks during low power link state; otherwise, wake up signals may be missed, and wake up retry mechanism may be required. Another drawback of Wake up signaling over data lines is that it forces both sides to keep their flow control line in a "Clear to Send" state during low power mode. In some platforms, this can be a functional challenge which can also result in undesired DC (Direct Current) currents if pull-up resistors exist on the line. Wake up signaling over out-of-band signals allows for transitions that are free of receive data errors, but it would cost additional hardware traces and I/O (Input/Output) pins.

Figure 3A:
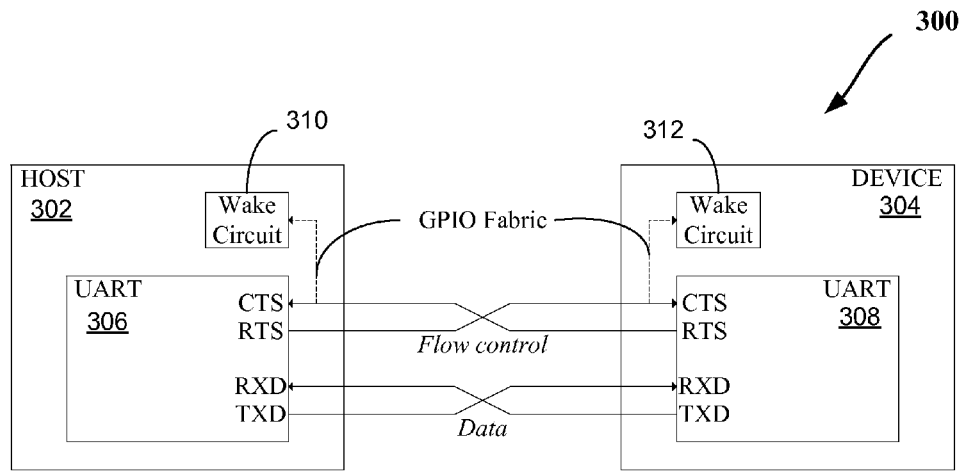
FIG. 3A illustrates a block diagram of a system with a four-wire UART interface, according to an embodiment.

FIG. 3A illustrates a block diagram of a system 300 with a four-wire UART interface, according to an embodiment. As shown, system 300 includes a host 302 (which can operate as a master in a master-slave system) and a device 304 (e.g., which can operate as a slave for the host 302). The host and device may each be one of the agents or components discussed with reference to FIGS. 1-2 and/or 5-7. UART interface logic 306 and 308 use hardware flow control signals (signals CTS and RTS) and data lines (RXD and TXD). The host and device also include CTS wake circuits/logic 310 and 312, which can be implemented via GPIO (General-Purpose Input Output) and/or PM (Power Management) register(s) configuration. In an embodiment, logic 150 includes the wake circuits/logic 310 and/or 312.

Figure 3B:
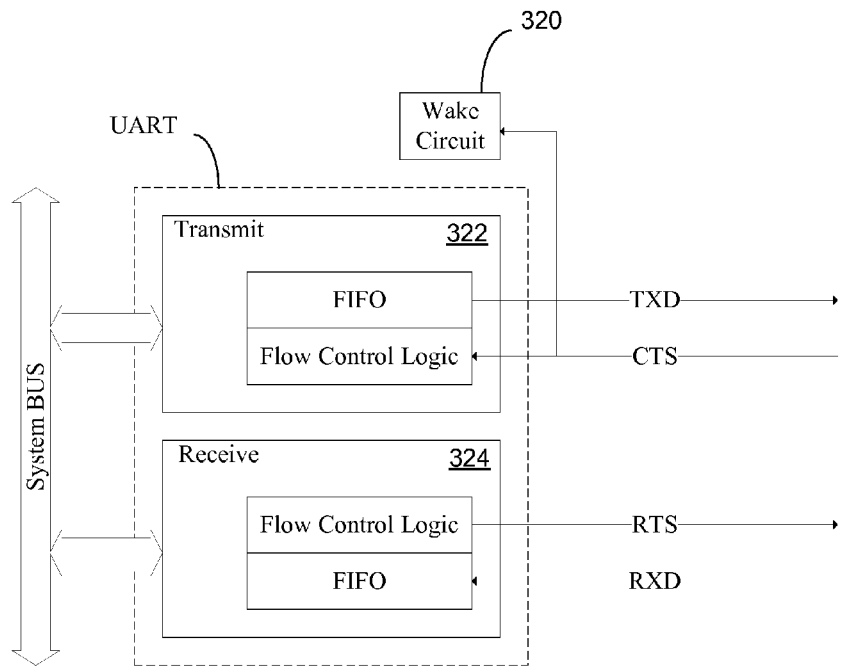
FIG. 3B illustrates a block diagram of components of a UART logic, according to some embodiments.

FIG. 3B illustrates a block diagram of components of a UART logic, according to some embodiments. Wake circuit/logic 320 may be the same as or similar to wake circuits/logic 310 and/or 312 of FIG. 3A. The UART illustrated may be the same or similar to the UART interfaces 306 and/or 308 of FIG. 3A and is coupled to a system bus/interconnect (such as those discussed herein with reference to the other figures). The UART logic includes transmit logic 322 and receive logic 324. As illustrated, logic 322/324 include FIFO (First-In, First-Out) buffers (e.g., to store transmit/receive data) and flow control logic (e.g., to facilitate efficient and/or robust link power management for four-wire UART interfaces), as will be further discussed herein, e.g., with reference to FIGS. 4A-4C. In an embodiment, logic 150 includes the FIFO(s) and/or flow control logic.

Figure 4A:
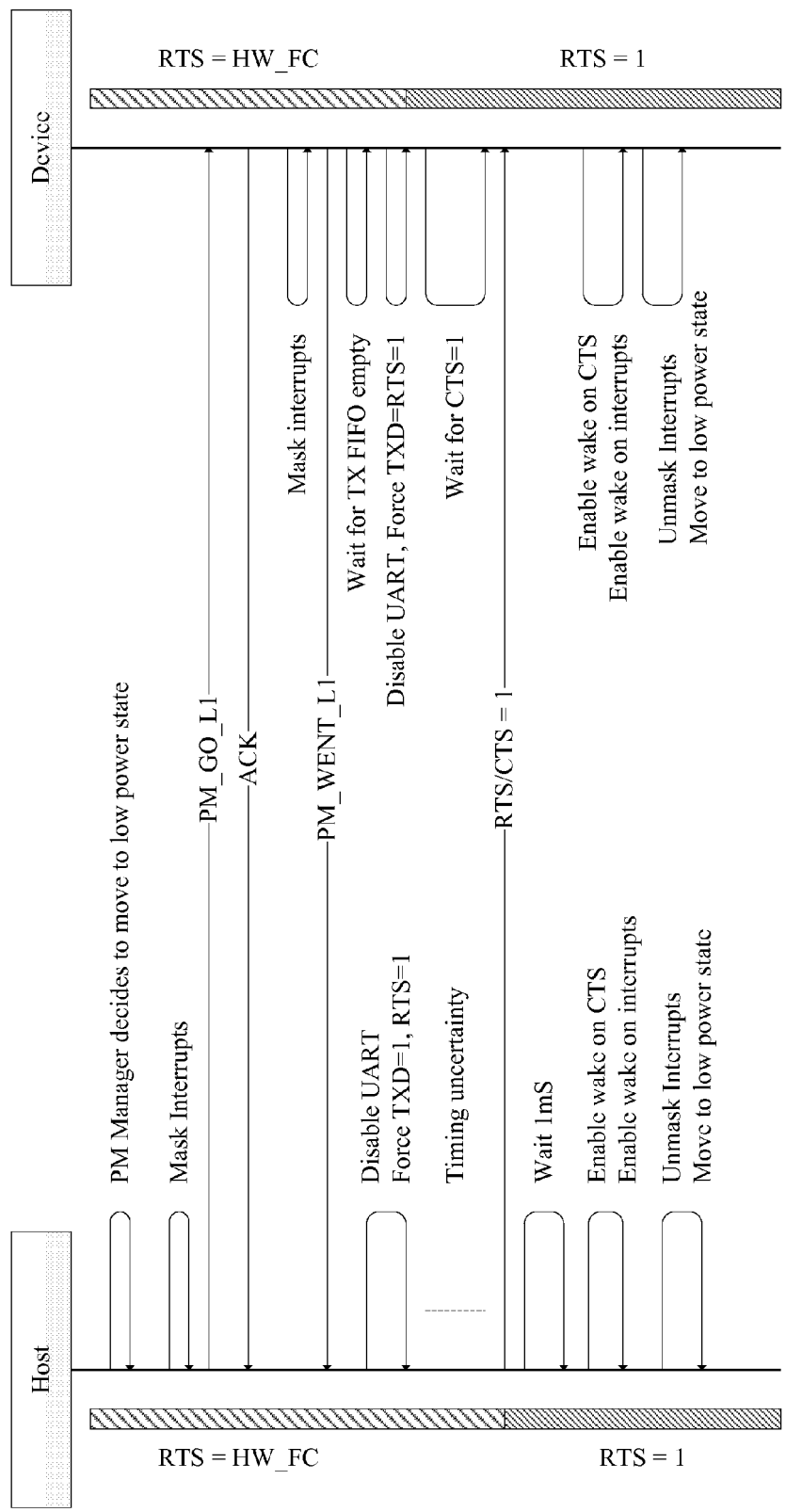
FIG. 4A illustrates operations to cause a host-initiated power down, in accordance with an embodiment.
Figure 4B:
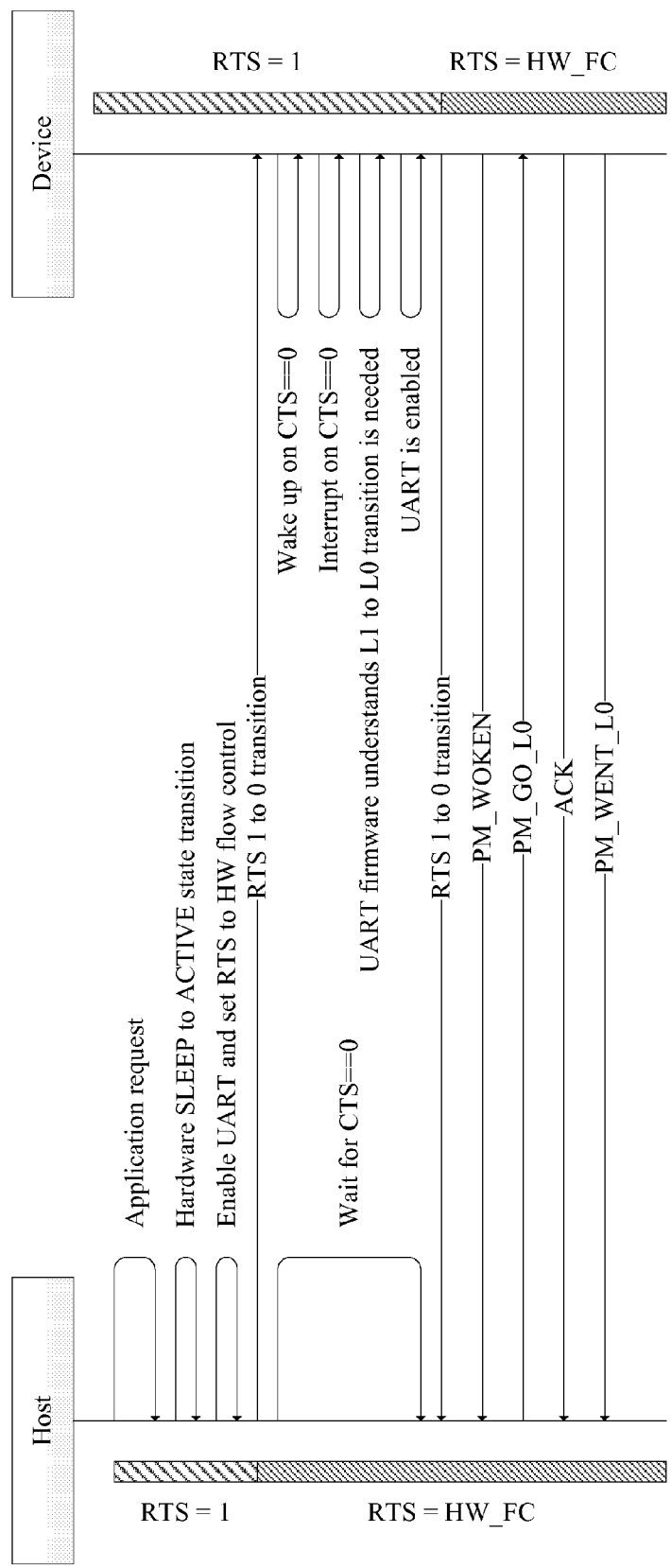
FIG. 4B illustrates operations to cause a host-initiated wake, in accordance with an embodiment.
Figure 4C:
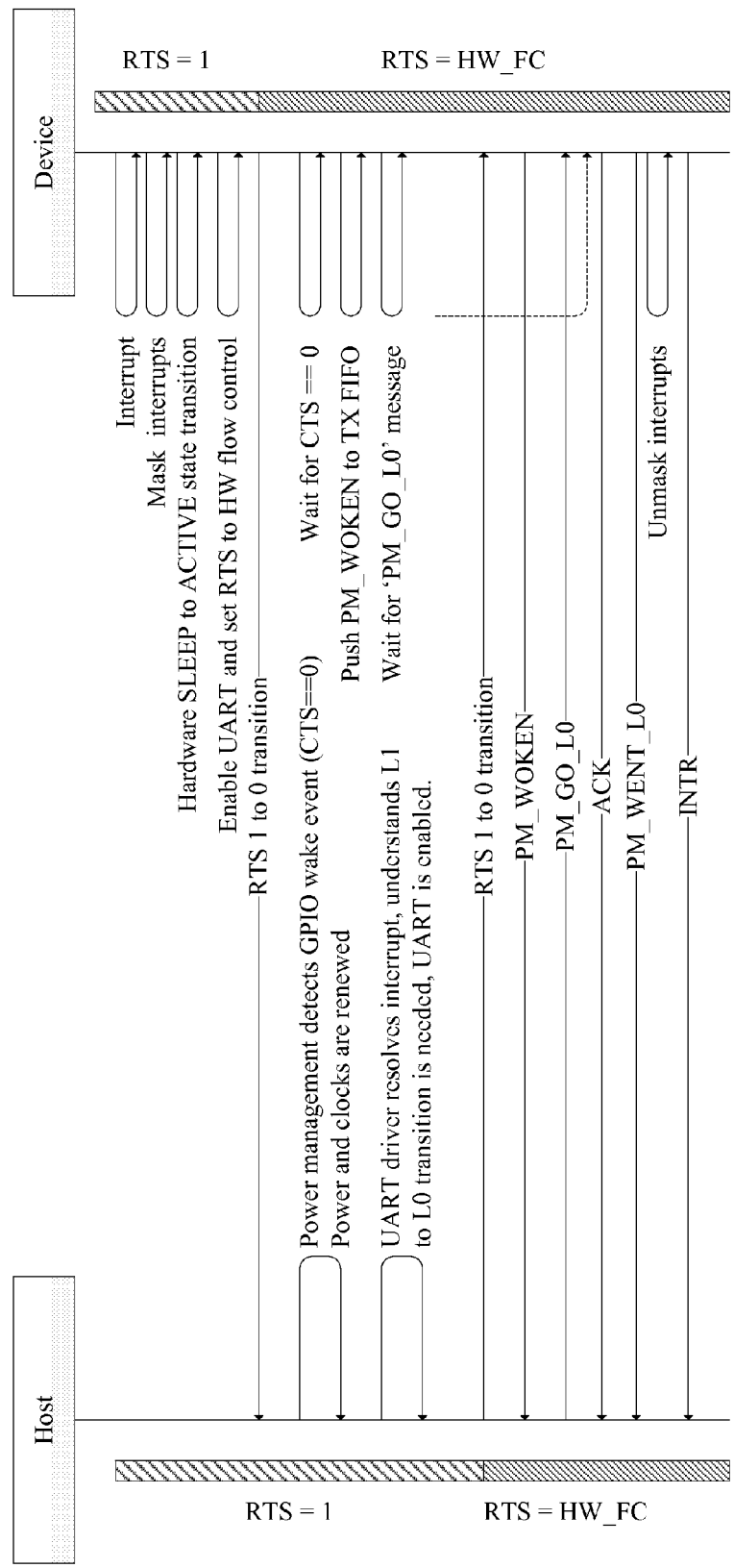
FIG. 4C illustrates operations to cause a device-initiated wake, in accordance with an embodiment.

FIGS. 4A, 4B, and 4C illustrate operational/signaling flow diagrams, in accordance with some embodiments. In one embodiment, various operations shown in FIGS. 4A-4C are performed by one or more components discussed with reference to FIGS. 1-3A, 3B, and 5-7. In an embodiment, logic 150 performs one or more operations discussed with reference to FIGS. 4A-4C. The host and device shown in FIGS. 4A-4C are the host and device discussed with reference to FIG. 3A in an embodiment. Also, the wake circuit logic discussed with reference to FIGS. 4A-4C are the same or similar to the wake circuit logic 310, 312, and/or 320 of FIGS. 3A-3B. Furthermore, the wait durations shown in FIGS. 4A-4C are merely examples and other durations may be used depending on the implementation.

In some embodiments, link power management logic (such as logic 150) uses RTS and CTS flow control signals, in conjunction with control messages sent over data lines. As discussed herein, link power status include an "active state" (or L0), and a "low power state" (or L1). Generally, in L0 state, all hardware is active and data characters are transmitted and received with no restriction (e.g., subject to hardware flow control), whereas in L1 state, no data may be transmitted or received. Moreover, in L1 state, the host and device are generally not allowed to transmit any data, and as a result both host and device may disable and/or power down their UART interface logic, and leave the wake detect circuits active.

Moreover, L0 and L1 are logical link states that do not directly dictate or defined by hardware or firmware states (for example, hardware may be active when link is in L1 state). In addition, since these are link states, they can occur as a result of handshake between both endpoints (i.e., the host and device).

Furthermore, transitions from L0 to L1 and vice versa, comprise a combination of control messages sent over data lines, and logic levels and transitions of the flow control lines, as described in more details below. Please note that the terms L0 and L1 used in this document are local abbreviations, and are not necessarily related to L0 and L1 terms used in PCI Express specification.

More particularly, FIG. 4A illustrates operations to cause a host-initiated power down, or otherwise entrance into a low power consumption state (or L1), in accordance with an embodiment. As illustrated in FIG. 4A, the host (or PM (Power Management) manager in this embodiment) sends a 'enter low power' message to the device. The device acknowledges by 'entering low power' message. The device raises the flow control signal. The host raises flow control signal. Then, both the host and device map their CTS lines to wake detect circuit (e.g., which will capture negative edge events on these lines and translates them to wake events). At this point, the link is in low power state. The host and device may disable UARTs and other internal circuits, except wake up detect circuits, until exit sequence (e.g., discussed with reference to FIGS. 4B and 4C). Also, as shown in FIG. 4A, the interrupts can be masked and unmasked at specific points during the flow.

FIG. 4B illustrates operations to cause a host-initiated wake, or otherwise exit from a low power consumption state (or transition from L1 to L0), in accordance with an embodiment. As shown in FIG. 4B, following a request to access the device (e.g., a data transfer or application request), host UART is enabled. The host RTS is asserted. The host then waits for 'PM_WOKEN' message from the device. The device wakes upon CTS assertion. Both the host and device disconnect their CTS lines from the wake detect circuitry. The device initializes its UART and associated hardware, and sends 'PM_WOKEN' message to the host. Then, the host initiates L1 to L0 transition handshake.

FIG. 4C illustrates operations to cause a device-initiated wake, or otherwise exit from a low power consumption state (or transition from L1 to L0), in accordance with an embodiment. As illustrated, following an internal wake up event, the device asserts its RTS output. The device waits for assertion of CTS, and for wake up handshake (device also sends 'PM_WOKEN' message as soon as CTS permits). The host detects CTS assertion and wakes up. Both host and device disconnect their CTS lines from the wake detect circuitry. The host asserts RTS (signaling it is ready to receive messages). The host sends an 'exit low power' message to device over TXD. The host waits for acknowledgement message from device. The device acknowledges by 'exited low power' message. At this point the link is back in active state or L0, and data messages can be transferred. Also, as shown in FIG. 4C, the interrupts can be masked and unmasked at specific points during the flow.

Moreover, some embodiments allow for link power management signaling of four wire UART interface, in a way that ensures: (a) no receive data errors are caused as result of entry to as well as exit from link low power state(s); and/or (b) wake events are detected with certainty, e.g., independently of available clock frequency, and with no need for asynchronous detection circuitry.

In accordance with an embodiment, when using a four-wire UART interface (e.g., with TXD, RXD, CTS, RTS signals such as shown in FIGS. 3A and 3B), entering the link into a low power state is initiated by message exchange over data lines, followed by rising of CTS and RTS lines to logic 1 levels. Each side waits for the CTS line of the other side to move to a logic level 1 before proceeding with the power down sequence (or entry into the L1 state). Each side then couples its CTS input to event detection logic (e.g., wake circuit logic 310, 312, and/or 320 of FIGS. 3A and 3B) that remains active during link residency in the low power state.

In accordance with one embodiment, exit from a low power state (link wake up) is initiated by assertion of RTS signal (e.g., driving it to logic 0) by the waking side which is then acknowledged by assertion of the CTS line by the woken side. This is followed by message exchange over the UART data lines. When a handshake is defined carefully, as in the examples shown in FIGS. 4A-fC, message integrity is guaranteed. This relieves implementation from the need to handle data errors as part of link wake up flow.

Further, in some UART implementations, the assertion to 1 of the RTS line upon entering low power mode and the deassertion to 0 of the RTS line when exiting low power mode would be a natural byproduct of the power state of the UART interface itself and will not require special line forcing. This attribute facilitates the usage of the flow control lines for power management signaling as utilized by some embodiments.

Additionally, pure synchronous logic (e.g., logic 150) may be used for wake up detection, e.g., without compromising the certainty of wake up detection. The clock frequency chosen for wake up detect logic may be as low as desired (e.g., for aspects of low power consumption, and/or resource sharing), lowering sampling clock frequency only affects wake up latency. Wake up detection probability remains certain regardless of sampling clock frequency. This eliminates the need to include asynchronous circuits, in cases that design flow favors synchronous logic, or implementing such protocols on legacy hardware which does not include asynchronous detection circuits. Alternatively, this relives protocol implementation from the need to incorporate wake up retry mechanisms.

Moreover, some solutions may be divided into two categories. First, Out-of-band wake up signals can be used but this requires additional pin(s) as discussed above. Second, wake up can be performed over data lines (with or without in-band 'break' signaling). Hence, some embodiments provide one or more of the following advantages:

(1) Wake Certainty: solutions that employ wake up over data often do not wake at 100% probability. That is wake up character sent over TXD line may or may not wake the other side, depending on the duration of the character, and the properties of the wake up circuit. To mitigate the non-certain wake, a retry mechanism is required, adding complexity to such a solution.

(2) Receive Data Errors: if wake is transmitted over data line, a simultaneous wake (or 'near-simultaneous wake') race scenario is likely to inject erroneous characters to one or two receivers (RXD parsers). To mitigate this possibility, additional error handling mechanism is required, adding to the complexity of the solution. At least one embodiment guarantees no data errors during a wake up handshake; thus, eliminating the need for an associated error handling mechanism. An embodiment still employs link error handling mechanism for various link errors that are not necessarily associated with link power management.

(3) Hardware Implementation, Synchronous Design: an embodiment allows use of relatively simple synchronous logic (e.g., running on 32.768 KHz RTC (Real-Time Clock) hardware) and is independent of clock frequency used for wake up, without sacrificing wake certainty, and with no need for asynchronous circuits.

Figure 5:
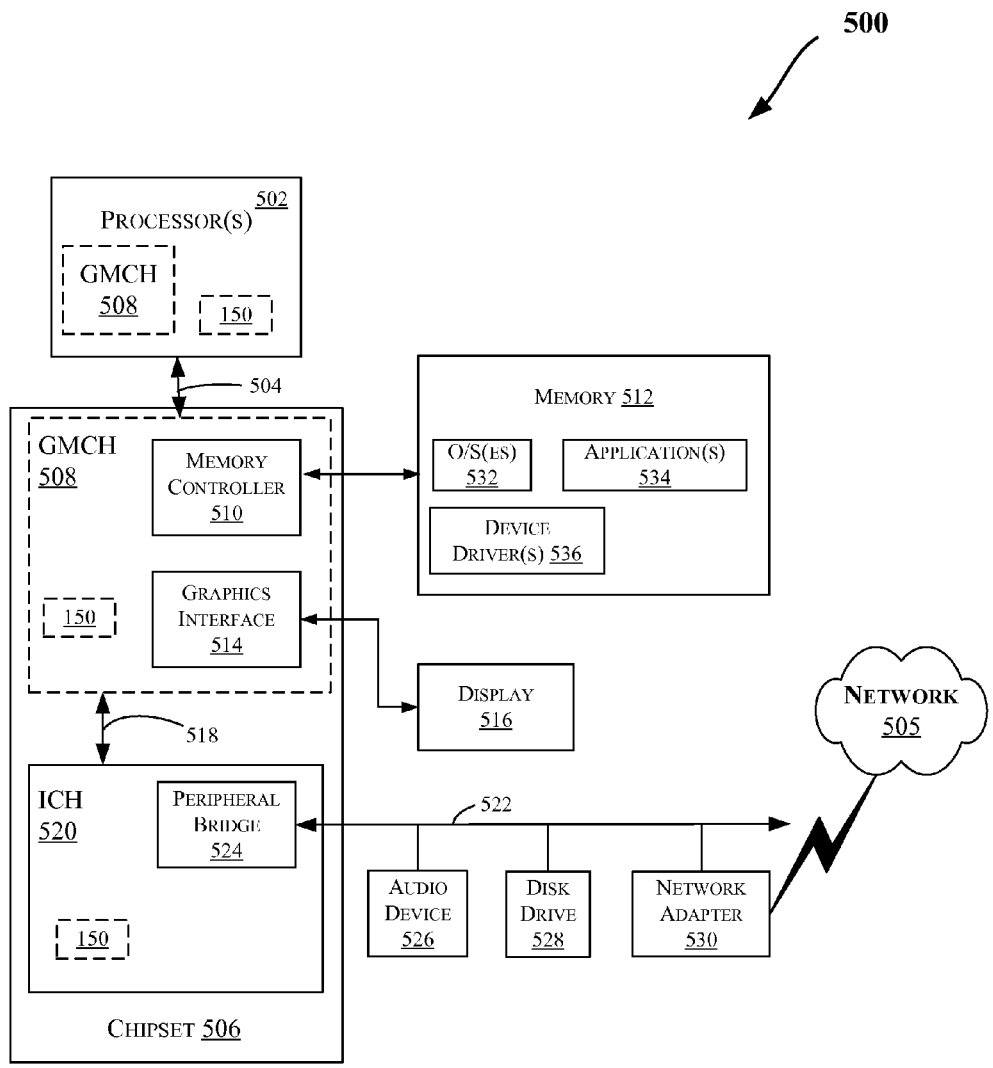
FIG. 5 illustrates a block diagram of an embodiment of a computing system, which can be utilized to implement one or more embodiments discussed herein.

FIG. 5 illustrates a block diagram of an embodiment of a computing system 500. One or more of the agents 102 of FIG. 1 may comprise one or more components of the computing system 500. Also, various components of the system 500 include logic 150 as illustrated in FIG. 5. However, logic 150 may be provided in locations throughout the system 500, including or excluding those illustrated. The computing system 500 includes one or more central processing unit(s) (CPUs) 502 (collectively referred to herein as "processors 502" or more generically "processor 502") coupled to an interconnection network (or bus) 504. The operations discussed with reference to FIGS. 1-4C can be performed by one or more components of the system 500.

The processors 502 can be any type of processor such as a general purpose processor, a network processor (which processes data communicated over a computer network 505), etc. (including a reduced instruction set computer (RISC) processor or a complex instruction set computer (CISC)). Moreover, the processors 502 has a single or multiple core design. The processors 502 with a multiple core design integrate different types of processor cores on the same integrated circuit (IC) die. Also, the processors 502 with a multiple core design can be implemented as symmetrical or asymmetrical multiprocessors.

The processor 502 include one or more caches, which are private and/or shared in various embodiments. Generally, a cache stores data corresponding to original data stored elsewhere or computed earlier. To reduce memory access latency, once data is stored in a cache, future use can be made by accessing a cached copy rather than prefetching or recomputing the original data. The cache(s) can be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 500. Additionally, such cache(s) can be located in various locations (e.g., inside other components to the computing systems discussed herein, including systems of FIG. 1, 2, 5, 6, or 7).

A chipset 506 can additionally be coupled to the interconnection network 504. Further, the chipset 506 includes a graphics memory control hub (GMCH) 508. The GMCH 508 includes a memory controller 510 that is coupled to a memory 512. The memory 512 stores data, e.g., including sequences of instructions that are executed by the processor 502, or any other device in communication with components of the computing system 500. Also, in one embodiment, the memory 512 includes one or more volatile storage (or memory) devices such as random access memory (RAM), dynamic RAM (DRAM), synchronous DRAM (SDRAM), static RAM (SRAM), etc. Nonvolatile memory can also be utilized such as a hard disk. Additional devices can be coupled to the interconnection network 504, such as multiple processors and/or multiple system memories.

The GMCH 508 further includes a graphics interface 514 coupled to a display device 516 (e.g., via a graphics accelerator in an embodiment). In one embodiment, the graphics interface 514 is coupled to the display device 516 via an Accelerated Graphics Port (AGP) or Peripheral Component Interconnect (PCI) (or PCI express (PCIe) interface). In an embodiment, the display device 516 (such as a flat panel display) is coupled to the graphics interface 514 through, for example, a signal converter that translates a digital representation of an image stored in a storage device such as video memory or system memory (e.g., memory 512) into display signals that are interpreted and displayed by the display 516.

As shown in FIG. 5, a hub interface 518 couples the GMCH 508 to an input/output control hub (ICH) 520. The ICH 520 provides an interface to input/output (I/O) devices coupled to the computing system 500. The ICH 520 is coupled to a bus 522 through a peripheral bridge (or controller) 524, such as a Peripheral Component Interconnect (PCI) bridge that is compliant with the PCIe specification, a Universal Serial Bus (USB) controller, I2C, etc. The bridge 524 provides a data path between the processor 502 and peripheral devices. Other types of topologies can also be utilized. Additionally, multiple buses can be coupled to the ICH 520, e.g., through multiple bridges or controllers. Further, bus 522 can comprises other types and configurations of bus systems. Moreover, other peripherals coupled to the ICH 520 include, in various embodiments, integrated drive electronics (IDE) or small computer system interface (SCSI) hard drive(s), USB port(s), I2C device(s), a keyboard, a mouse, parallel port(s), serial port(s), floppy disk drive(s), digital output support (e.g., digital video interface (DVI)), etc.

The bus 522 is coupled to an audio device 526, one or more disk drive(s) 528, and a network adapter 530 (which is a NIC in an embodiment). In one embodiment, the network adapter 530 or other devices coupled to the bus 522 communicate with the chipset 506. Also, various components (such as the network adapter 530) are coupled to the GMCH 508 in some embodiments. In addition, the processor 502 and the GMCH 508 can be combined to form a single chip. In an embodiment, the memory controller 510 is provided in one or more of the CPUs 502. Further, in an embodiment, GMCH 508 and ICH 520 are combined into a Peripheral Control Hub (PCH).

Additionally, the computing system 500 includes volatile and/or nonvolatile memory (or storage). For example, nonvolatile memory includes one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 512 includes one or more of the following in an embodiment: an operating system (O/S) 532, application 534, and/or device driver 536. The memory 512 can also include regions dedicated to Memory Mapped I/O (MMIO) operations. Programs and/or data stored in the memory 512 are swapped into the disk drive 528 as part of memory management operations. The application(s) 534 execute (e.g., on the processor(s) 502) to communicate one or more packets with one or more computing devices coupled to the network 505. In an embodiment, a packet is a sequence of one or more symbols and/or values that are encoded by one or more electrical signals transmitted from at least one sender to at least on receiver (e.g., over a network such as the network 505). For example, each packet has a header that includes various information which is utilized in routing and/or processing the packet, such as a source address, a destination address, packet type, etc. Each packet has a payload that includes the raw data (or content) the packet is transferring between various computing devices over a computer network (such as the network 505).

In an embodiment, the application 534 utilizes the O/S 532 to communicate with various components of the system 500, e.g., through the device driver 536. Hence, the device driver 536 includes network adapter 530 specific commands to provide a communication interface between the O/S 532 and the network adapter 530, or other I/O devices coupled to the system 500, e.g., via the chipset 506.

In an embodiment, the O/S 532 includes a network protocol stack. A protocol stack generally refers to a set of procedures or programs that is executed to process packets sent over a network 505, where the packets conform to a specified protocol. For example, TCP/IP (Transport Control Protocol/Internet Protocol) packets are processed using a TCP/IP stack. The device driver 536 indicates the buffers in the memory 512 that are to be processed, e.g., via the protocol stack.

The network 505 can include any type of computer network. The network adapter 530 can further include a direct memory access (DMA) engine, which writes packets to buffers (e.g., stored in the memory 512) assigned to available descriptors (e.g., stored in the memory 512) to transmit and/or receive data over the network 505. Additionally, the network adapter 530 includes a network adapter controller logic (such as one or more programmable processors) to perform adapter related operations. In an embodiment, the adapter controller is a MAC (media access control) component. The network adapter 530 further includes a memory, such as any type of volatile/nonvolatile memory (e.g., including one or more cache(s) and/or other memory types discussed with reference to memory 512).

Figure 6:
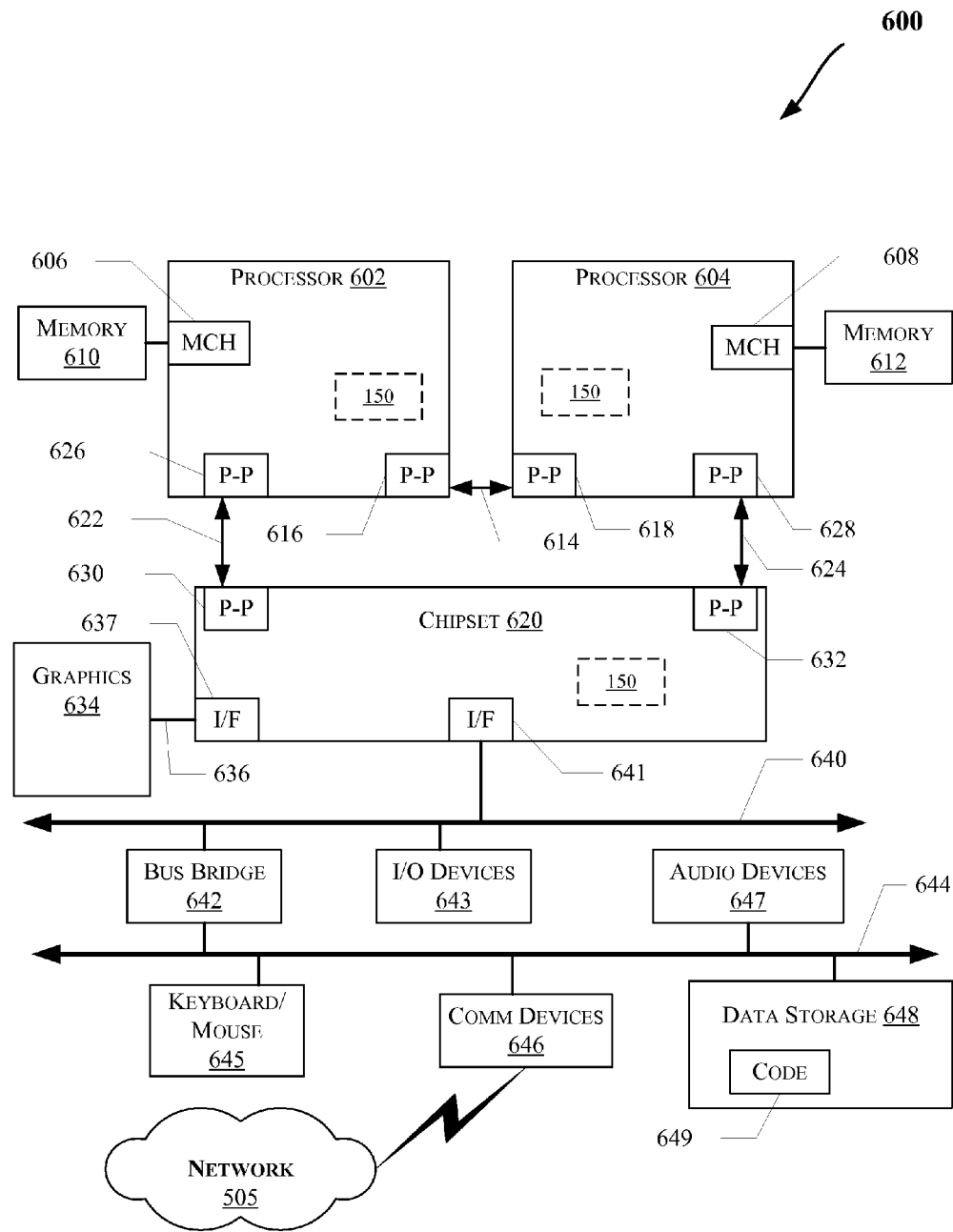
FIG. 6 illustrates a block diagram of an embodiment of a computing system, which can be utilized to implement one or more embodiments discussed herein.

FIG. 6 illustrates a computing system 600 that is arranged in a point-to-point (PtP) configuration, according to an embodiment. In particular, FIG. 6 shows a system where processors, memory, and input/output devices are interconnected by a number of point-to-point interfaces. The operations discussed with reference to FIGS. 1-5 can be performed by one or more components of the system 600.

As illustrated in FIG. 6, the system 600 includes several processors, of which only two, processors 602 and 604 are shown for clarity. The processors 602 and 604 each include a local Memory Controller Hub (MCH) 606 and 608 to enable communication with memories 610 and 612. The memories 610 and/or 612 store various data such as those discussed with reference to the memory 612 of FIG. 6. As shown in FIG. 6, the processors 602 and 604 (or other components of system 600 such as chipset 620, I/O devices 643, etc.) can also include one or more cache(s) such as those discussed with reference to FIGS. 1-5.

In an embodiment, the processors 602 and 604 are one of the processors 602 discussed with reference to FIG. 6. The processors 602 and 604 exchange data via a point-to-point (PtP) interface 614 using PtP interface circuits 616 and 618, respectively. Also, the processors 602 and 604 can each exchange data with a chipset 620 via individual PtP interfaces 622 and 624 using point-to-point interface circuits 626, 628, 630, and 632. The chipset 620 can further exchange data with a high-performance graphics circuit 634 via a high-performance graphics interface 636, e.g., using a PtP interface circuit 637.

In at least one embodiment, logic 150 is provided in one or more of the processors 602, 604 and/or chipset 620. Other embodiments, however, may exist in other circuits, logic units, or devices within the system 600 of FIG. 6. Furthermore, other embodiments may be distributed throughout several circuits, logic units, or devices illustrated in FIG. 6. For example, various components of the system 600 include the logic 150 of FIG. 1. However, logic 150 can be provided in locations throughout the system 600, including or excluding those illustrated.

The chipset 620 communicates with the bus 640 using a PtP interface circuit 641. The bus 640 has one or more devices that communicate with it, such as a bus bridge 642 and I/O devices 643. Via a bus 644, the bus bridge 642 communicates with other devices such as a keyboard/mouse 645, communication devices 646 (such as modems, network interface devices, or other communication devices that communicate with the computer network 605), audio I/O device, and/or a data storage device 648. The data storage device 648 stores code 649 that is executed by the processors 602 and/or 604.

Figure 7:
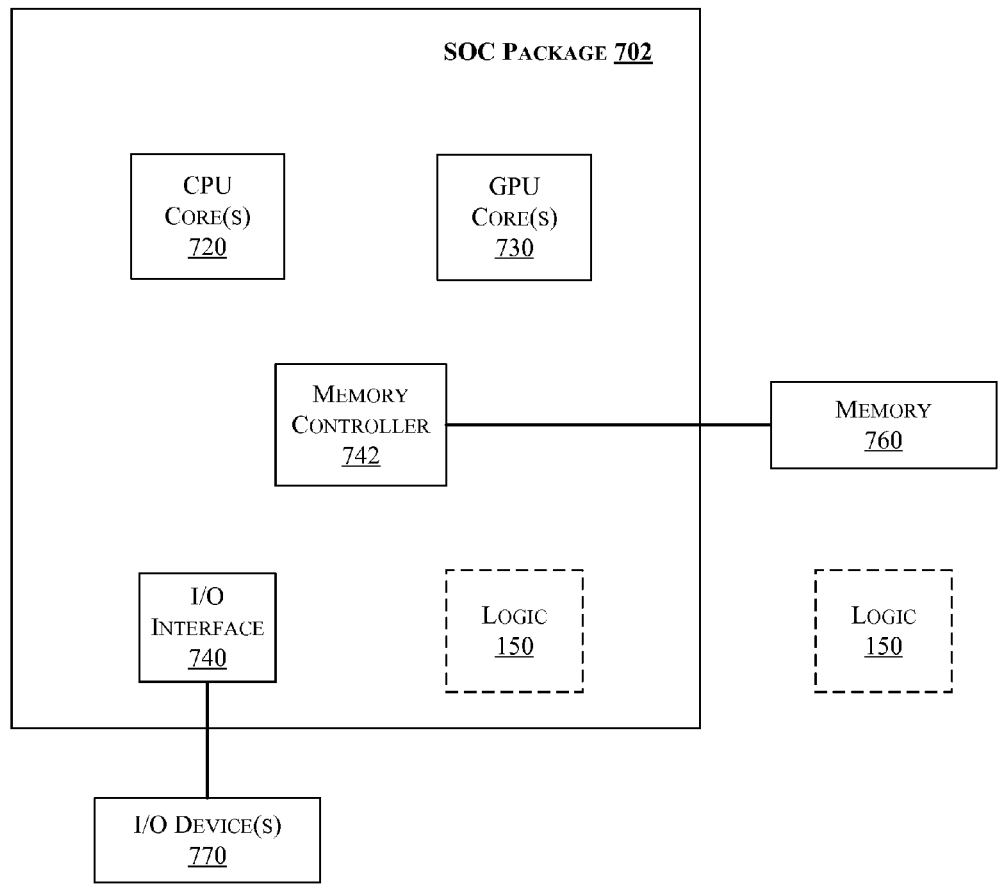
FIG. 7 illustrates a block diagram of a System On Chip (SOC) package in accordance with an embodiment.

In some embodiments, one or more of the components discussed herein can be embodied as a System On Chip (SOC) device. FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 are coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 (which can be similar to or the same as memory discussed herein with reference to the other figures) via the memory controller 742. In an embodiment, the memory 760 (or a portion of it) can be integrated on the SOC package 702.

The I/O interface 740 is coupled to one or more I/O devices 770, e.g., via an interconnect and/or bus such as discussed herein with reference to other figures. I/O device(s) 770 include one or more of a keyboard, a mouse, a touchpad, a display, an image/video capture device (such as a camera or camcorder/video recorder), a touch screen, a speaker, or the like. Furthermore, SOC package 702 includes/integrates the logic 150 in an embodiment. Alternatively, the logic 150 is provided outside of the SOC package 702 (i.e., as a discrete logic).

The following examples pertain to further embodiments. Example 1 includes an apparatus comprising: logic to cause a link to enter into a low power consumption state in response to a message exchange over data lines of a UART (Universal Asynchronous Receiver/Transmitter) interface, wherein the message exchange over the data lines of the UART interface is to be followed by a modification to one or more flow control signals coupled to the UART interface. Example 2 includes the apparatus of example 1, wherein the one or more flow control signals are to comprise one of the: CTS (Clear To Send) or RTS (Request To Send) signals. Example 3 includes the apparatus of example 1, wherein the data lines of the UART interface are to comprise RXD (Receive Data) and TXD (Transmit Data) lines. Example 4 includes the apparatus of example 1, wherein the link is to couple a device and a host and wherein each side of the link is to wait for a CTS signal of the other side to move to a first logic level before proceeding with entry into the low power consumption state. Example 5 includes the apparatus of example 1, comprising wake event detection logic to remain in an active state during residency of the link in the low power consumption state. Example 6 includes the apparatus of example 1, wherein the link is to couple a device and a host and wherein each side of the link is to couple its CTS signal to wake event detection logic that is to remain in an active state during residency of the link in the low power consumption state. Example 7 includes the apparatus of example 1, wherein exit from the low power consumption state is to be initiated by a modification to one of the one or more control flow signals. Example 8 includes the apparatus of example 7, wherein the link is to couple a device and a host and wherein the modification to one of the one or more control flow signals is to include an assertion of an RTS signal of the UART interface by a waking side of the link. Example 9 includes the apparatus of example 8, wherein the assertion of the RTS signal is to be acknowledged by assertion of a CTS signal of the UART interface by the woken side of the link. Example 10 includes the apparatus of example 9, wherein the acknowledgment of the RTS signal is to be followed by a message exchange over the data lines of the UART interface. Example 11 includes the apparatus of example 1, wherein the link is to comprise a point-to-point link. Example 12 includes the apparatus of example 1, wherein the logic, a processor having one or more processor cores, and memory are on a same integrated device.

Example 13 includes a method comprising: causing a link to enter into a low power consumption state in response to a message exchange over data lines of a UART (Universal Asynchronous Receiver/Transmitter) interface, wherein the message exchange over the data lines of the UART interface is followed by a modification to one or more flow control signals coupled to the UART interface. Example 14 includes the method of example 13, wherein the one or more flow control signals comprise one of the: CTS (Clear To Send) or RTS (Request To Send) signals. Example 15 includes the method of example 13, wherein the data lines of the UART interface comprise RXD (Receive Data) and TXD (Transmit Data) lines. Example 16 includes the method of example 13, further comprising: the link coupling a device and a host; and each side of the link waiting for a CTS signal of the other side to move to a first logic level before proceeding with entry into the low power consumption state. Example 17 includes the method of example 13, further comprising wake event detection logic remaining in an active state during residency of the link in the low power consumption state. Example 18 includes the method of example 13, further comprising: the link coupling a device and a host; and each side of the link coupling its CTS signal to wake event detection logic that remains in an active state during residency of the link in the low power consumption state. Example 19 includes the method of example 13, further comprising initiating exit from the low power consumption state by a modification to one of the one or more control flow signals. Example 20 includes the method of example 13, further comprising: the link coupling a device and a host; and the modification to one of the one or more control flow signals comprising an assertion of an RTS signal of the UART interface by a waking side of the link. Example 21 includes the method of example 20, further comprising acknowledging the assertion of the RTS signal by assertion of a CTS signal of the UART interface by the woken side of the link. Example 22 includes the method of example 21, further comprising following the acknowledgment of the RTS signal by a message exchange over the data lines of the UART interface.

Example 23 includes a system comprising: a display device; a processor coupled to the display device to cause the display device to display one or more images stored in memory; logic to cause a link to enter into a low power consumption state in response to a message exchange over data lines of a UART (Universal Asynchronous Receiver/Transmitter) interface, wherein the message exchange over the data lines of the UART interface is to be followed by a modification to one or more flow control signals coupled to the UART interface. Example 24 includes the system of example 23, wherein the one or more flow control signals are to comprise one of the: CTS (Clear To Send) or RTS (Request To Send) signals. Example 25 includes the system of example 23, wherein the data lines of the UART interface are to comprise RXD (Receive Data) and TXD (Transmit Data) lines. Example 26 includes the system of example 23, wherein the link is to couple a device and a host and wherein each side of the link is to wait for a CTS signal of the other side to move to a first logic level before proceeding with entry into the low power consumption state. Example 27 includes the system of example 23, comprising wake event detection logic to remain in an active state during residency of the link in the low power consumption state. Example 28 includes the system of example 23, wherein the link is to couple a device and a host and wherein each side of the link is to couple its CTS signal to wake event detection logic that is to remain in an active state during residency of the link in the low power consumption state. Example 29 includes the system of example 23, wherein exit from the low power consumption state is to be initiated by a modification to one of the one or more control flow signals. Example 30 includes the system of example 29, wherein the link is to couple a device and a host and wherein the modification to one of the one or more control flow signals is to include an assertion of an RTS signal of the UART interface by a waking side of the link. Example 31 includes the system of example 30, wherein the assertion of the RTS signal is to be acknowledged by assertion of a CTS signal of the UART interface by the woken side of the link. Example 32 includes the system of example 31, wherein the acknowledgment of the RTS signal is to be followed by a message exchange over the data lines of the UART interface. Example 33 includes the system of example 23, wherein the link is to comprise a point-to-point link. Example 34 includes the system of example 23, wherein the logic, the processor having one or more processor cores, and the memory are on a same integrated device.

Example 35 includes an apparatus comprising means to perform a method as set forth in any preceding example. Example 36 includes machine-readable storage including machine-readable instructions, when executed, to implement a method or realize an apparatus as set forth in any preceding example.

In various embodiments, the operations discussed herein, e.g., with reference to FIGS. 1-7, are implemented as hardware (e.g., circuitry), software, firmware, microcode, or combinations thereof, which can be provided as a computer program product, e.g., including a tangible (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7. Additionally, such computer-readable media can be downloaded as a computer program product, wherein the program may be transferred from a remote computer (e.g., a server) to a requesting computer (e.g., a client) through data signals in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic to cause a link to enter into a low power consumption state in response to a message exchange over data lines of a UART (Universal Asynchronous Receiver/Transmitter) interface,
   wherein the message exchange over the data lines of the UART interface is to be followed by a modification to one or more flow control signals coupled to the UART interface, wherein one or more subsequent interrupts are to be masked after the link enters into the low power consumption state, wherein the one or more masked subsequent interrupts are to be unmasked at both ends of the link after a wake operation, responsive to an interrupt signal or a CTS (Clear To Send) signal, is enabled.

2. The apparatus of claim 1, wherein the one or more flow control signals are to comprise one of the CTS (Clear To Send) signal or an RTS (Request To Send) signal.

3. The apparatus of claim 1, wherein the data lines of the UART interface are to comprise RXD (Receive Data) and TXD (Transmit Data) lines.

4. The apparatus of claim 1, wherein the link is to couple a device and a host and wherein each side of the link is to wait for a CTS signal of the other side to move to a first logic level before proceeding with entry into the low power consumption state.

5. The apparatus of claim 1, comprising wake event detection logic to remain in an active state during residency of the link in the low power consumption state.

6. The apparatus of claim 1, wherein the link is to couple a device and a host and wherein each side of the link is to couple its CTS signal to wake event detection logic that is to remain in an active state during residency of the link in the low power consumption state.

7. The apparatus of claim 1, wherein exit from the low power consumption state is to be initiated by a modification to one of the one or more control flow signals.

8. The apparatus of claim 7, wherein the link is to couple a device and a host and wherein the modification to one of the one or more control flow signals is to include an assertion of an RTS signal of the UART interface by a waking side of the link.

9. The apparatus of claim 8, wherein the assertion of the RTS signal is to be acknowledged by assertion of a CTS signal of the UART interface by the woken side of the link.

10. The apparatus of claim 9, wherein the acknowledgment of the RTS signal is to be followed by a message exchange over the data lines of the UART interface.

11. The apparatus of claim 1, wherein the link is to comprise a point-to-point link.

12. The apparatus of claim 1, wherein the logic, a processor having one or more processor cores, and memory are on a same integrated device.

13. A method comprising:
causing a link to enter into a low power consumption state in response to a message exchange over data lines of a UART (Universal Asynchronous Receiver/Transmitter) interface,
wherein the message exchange over the data lines of the UART interface is followed by a modification to one or more flow control signals coupled to the UART interface, wherein one or more subsequent interrupts are masked after the link enters into the low power consumption state, wherein the one or more masked subsequent interrupts are unmasked at both ends of the link after a wake operation, responsive to an interrupt signal or a CTS (Clear To Send) signal, is enabled.

14. The method of claim 13, wherein the one or more flow control signals comprise one of the CTS (Clear To Send) signal or an RTS (Request To Send) signal.

15. The method of claim 13, wherein the data lines of the UART interface comprise RXD (Receive Data) and TXD (Transmit Data) lines.

16. The method of claim 13, further comprising:
the link coupling a device and a host; and
each side of the link waiting for a CTS signal of the other side to move to a first logic level before proceeding with entry into the low power consumption state.

17. The method of claim 13, further comprising wake event detection logic remaining in an active state during residency of the link in the low power consumption state.

18. The method of claim 13, further comprising:
the link coupling a device and a host; and
each side of the link coupling its CTS signal to wake event detection logic that remains in an active state during residency of the link in the low power consumption state.

19. The method of claim 13, further comprising initiating exit from the low power consumption state by a modification to one of the one or more control flow signals.

20. The method of claim 13, further comprising:
the link coupling a device and a host; and
the modification to one of the one or more control flow signals comprising an assertion of an RTS signal of the UART interface by a waking side of the link.

21. The method of claim 20, further comprising acknowledging the assertion of the RTS signal by assertion of a CTS signal of the UART interface by the woken side of the link.

22. The method of claim 21, further comprising following the acknowledgment of the RTS signal by a message exchange over the data lines of the UART interface.

23. A system comprising:
a display device;
a processor coupled to the display device to cause the display device to display one or more images stored in memory;
logic to cause a link to enter into a low power consumption state in response to a message exchange over data lines of a UART (Universal Asynchronous Receiver/Transmitter) interface,
wherein the message exchange over the data lines of the UART interface is to be followed by a modification to one or more flow control signals coupled to the UART interface, wherein one or more subsequent interrupts are to be masked after the link enters into the low power consumption state, wherein the one or more masked subsequent interrupts are to be unmasked at both ends of the link after a wake operation, responsive to an interrupt signal or a CTS (Clear To Send) signal, is enabled.

24. The system of claim 23, wherein the one or more flow control signals are to comprise one of the CTS (Clear To Send) signal or an RTS (Request To Send) signal.

25. The system of claim 23, wherein the data lines of the UART interface are to comprise RXD (Receive Data) and TXD (Transmit Data) lines.

* * * * *